(12) United States Patent
Strozyk

(10) Patent No.: US 7,218,511 B1
(45) Date of Patent: May 15, 2007

(54) ELECTRICAL ENCLOSURE SYSTEM

(76) Inventor: Richard M. Strozyk, 30351 Sunset Rd., Detroit Lakes, MN (US) 56501

( * ) Notice: Subject to any disclaimer, the term of this patent is extended or adjusted under 35 U.S.C. 154(b) by 156 days.

(21) Appl. No.: 11/041,482

(22) Filed: Jan. 24, 2005

Related U.S. Application Data

(60) Provisional application No. 60/538,995, filed on Jan. 22, 2004.

(51) Int. Cl.
*H05K 5/00* (2006.01)
*H05K 7/00* (2006.01)

(52) U.S. Cl. ................................ 361/683; 417/44.1

(58) Field of Classification Search ............... 361/683; 417/44.1
See application file for complete search history.

(56) References Cited

U.S. PATENT DOCUMENTS

| | | | | |
|---|---|---|---|---|
| 3,164,668 | A | | 1/1965 | Skubal ........................ 174/45 |
| 3,716,762 | A | | 2/1973 | Shrader ...................... 317/107 |
| 3,800,063 | A | | 3/1974 | Di Maggio et al. ............ 174/38 |
| 3,872,234 | A | * | 3/1975 | Smith .......................... 174/38 |
| 4,230,578 | A | * | 10/1980 | Culp et al. ..................... 210/86 |
| 4,519,657 | A | | 5/1985 | Jensen .......................... 339/15 |
| 4,864,467 | A | | 9/1989 | Byrd et al. .................. 361/369 |
| 5,117,067 | A | | 5/1992 | Jaycox ......................... 174/38 |
| 5,184,279 | A | | 2/1993 | Horn ........................... 361/356 |
| 5,238,133 | A | | 8/1993 | Cox .............................. 220/3.8 |
| 5,378,058 | A | | 1/1995 | Tessmer ...................... 312/298 |
| 5,384,427 | A | | 1/1995 | Volk et al. ..................... 174/38 |
| 5,400,212 | A | | 3/1995 | Hanson ....................... 361/665 |
| 5,401,902 | A | | 3/1995 | Middlebrook et al. ......... 174/38 |
| 5,404,266 | A | | 4/1995 | Orchard et al. ............. 361/667 |
| 5,611,616 | A | * | 3/1997 | Chandler ..................... 362/154 |
| 6,014,077 | A | | 1/2000 | Beaumont et al. ........... 340/545 |
| 6,266,233 | B1 | | 7/2001 | O'Regan ..................... 361/659 |
| 6,462,666 | B1 | * | 10/2002 | Einck .......................... 340/623 |
| 6,483,031 | B2 | * | 11/2002 | O'Donnell ................... 174/58 |
| 6,667,437 | B2 | | 12/2003 | Schenk ........................ 174/38 |
| 6,683,535 | B1 | | 1/2004 | Utke ........................... 340/604 |
| 6,742,748 | B1 | | 6/2004 | Gretz ........................... 248/156 |

OTHER PUBLICATIONS

Power Post, Alderon Industries, Jimmurrayinc.com website printout, Jan. 1, 2005, 6 pages.
Controls, Alphageneral Services, Inc., Alphageneral.com website printout, Jan. 1, 2005, 1 page.
Pump Control Alarm System, Jiffy-Junction, Septronicsinc.com website printout, Jan. 1, 2005, 4 pages.
System Monitoring Devices, SPI, Informational printout, 3 pages.
Alarms, CSI, Chandlersystemsinc.com website printout, Jan. 1, 2005, 3 pages.

* cited by examiner

*Primary Examiner*—Lisa Lea-Edmonds
*Assistant Examiner*—Ingrid Wright

(57) ABSTRACT

An electrical enclosure system for effectively containing a pump control and alarm system within a single protective structure and providing convenient access to the electrical components within. The electrical enclosure system includes a tubular pedestal having an upper opening, and a cap removably positioned within the upper opening of the pedestal. The cap contains electrical wiring and components for a pump control/alarm system. A bracket is attached to the interior of the cap for receiving and securing the cables extending from the pump control/alarm system to a lower portion of the pedestal.

20 Claims, 9 Drawing Sheets

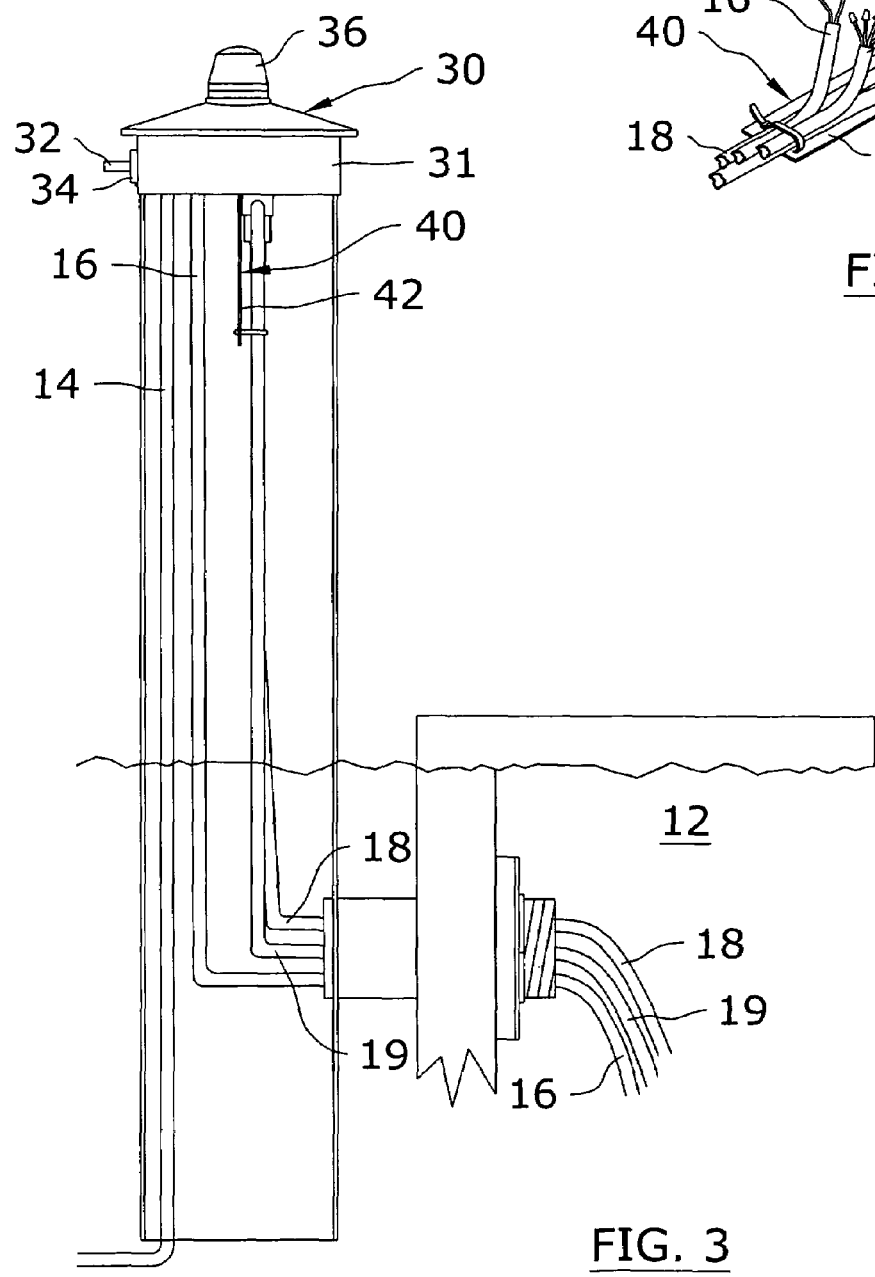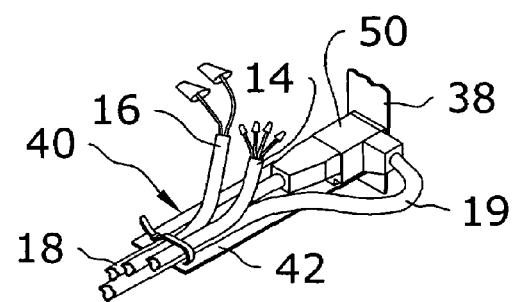
FIG. 4
FIG. 3

ELECTRICAL ENCLOSURE SYSTEM

CROSS REFERENCE TO RELATED APPLICATIONS

I hereby claim benefit under Title 35, United States Code, Section 119(e) of U.S. provisional patent application Ser. No. 60/538,995 filed Jan. 22, 2004. The 60/538,995 application is currently pending. The 60/538,995 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to electrical enclosures and more specifically it relates to an electrical enclosure system for effectively containing a pump control and alarm system within a single protective structure and providing convenient access to the electrical components within.

2. Description of the Related Art

Any discussion of the prior art throughout the specification should in no way be considered as an admission that such prior art is widely known or forms part of common general knowledge in the field.

Electrical enclosures have been in use for years for various applications (e.g. telecommunications, alarm circuits). FIG. 1a illustrates an exemplary electrical enclosure for an alarm circuit and pump control circuit that has an enclosure with conduit connected to the enclosure. FIG. 1b illustrates another exemplary electrical enclosure that is an improvement upon the structure shown in FIG. 1a. FIG. 1b illustrates the usage of (1) a tubular base A, (2) a mounting bracket B attached within the tubular base for supporting wiring and electrical components, and (3) a cap C removably attached to an upper end of the tubular base.

One problem with conventional electrical enclosures as shown in FIG. 1a is that they do not adequately protect the cables. A further problem with conventional electrical enclosures as shown in FIG. 1a is that they require attachment of the enclosure to a post or other support structure. A further problem with conventional electrical enclosures as shown in FIG. 1a is that they are time consuming and costly to install.

One problem with conventional electrical enclosures as shown in FIG. 1b is that they have multiple components required to be installed (tubular base, mounting bracket and cap). A further problem with conventional electrical enclosures as shown in FIG. 1b is that they are time consuming and costly to install.

While these devices may be suitable for the particular purpose to which they address, they are not as suitable for effectively containing a pump control and alarm system within a single protective structure and providing convenient access to the electrical components within. Conventional electrical enclosures for pump control and alarm systems are relatively complex in structure requiring a significant amount of time and labor to install and repair.

In these respects, the electrical enclosure system according to the present invention substantially departs from the conventional concepts and designs of the prior art, and in so doing provides an apparatus primarily developed for the purpose of effectively containing a pump control and alarm system within a single protective structure and providing convenient access to the electrical components within.

BRIEF SUMMARY OF THE INVENTION

In view of the foregoing disadvantages inherent in the known types of electrical enclosures now present in the prior art, the present invention provides a new electrical enclosure system construction wherein the same can be utilized for effectively containing a pump control and alarm system within a single protective structure and providing convenient access to the electrical components within.

The general purpose of the present invention, which will be described subsequently in greater detail, is to provide a new electrical enclosure system that has many of the advantages of the electrical enclosures mentioned heretofore and many novel features that result in a new electrical enclosure system which is not anticipated, rendered obvious, suggested, or even implied by any of the prior art electrical enclosures, either alone or in any combination thereof.

To attain this, the present invention generally comprises a tubular pedestal having an upper opening, and a cap removably positioned within the upper opening of the pedestal. The cap contains electrical wiring and components for a pump control/alarm system. A bracket is attached to the interior of the cap for receiving and securing the cables extending from the pump control/alarm system to a lower portion of the pedestal.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an electrical enclosure system that will overcome the shortcomings of the prior art devices.

A second object is to provide an electrical enclosure system for effectively containing a pump control and alarm system within a single protective structure and providing convenient access to the electrical components within.

Another object is to provide an electrical enclosure system that has a simple structure.

A further object is to provide an electrical enclosure system that does not require mounting or removing a separate bracket structure.

Another object is to provide an electrical enclosure system that provides lower manufacturing and installation costs.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 3 is a side cutaway view of the present invention in an exemplary installed configuration.

FIG. 4 is an upper perspective view of the bracket with wiring secured to the same.

DETAILED DESCRIPTION OF THE INVENTION

A. Overview

Figure 1B:
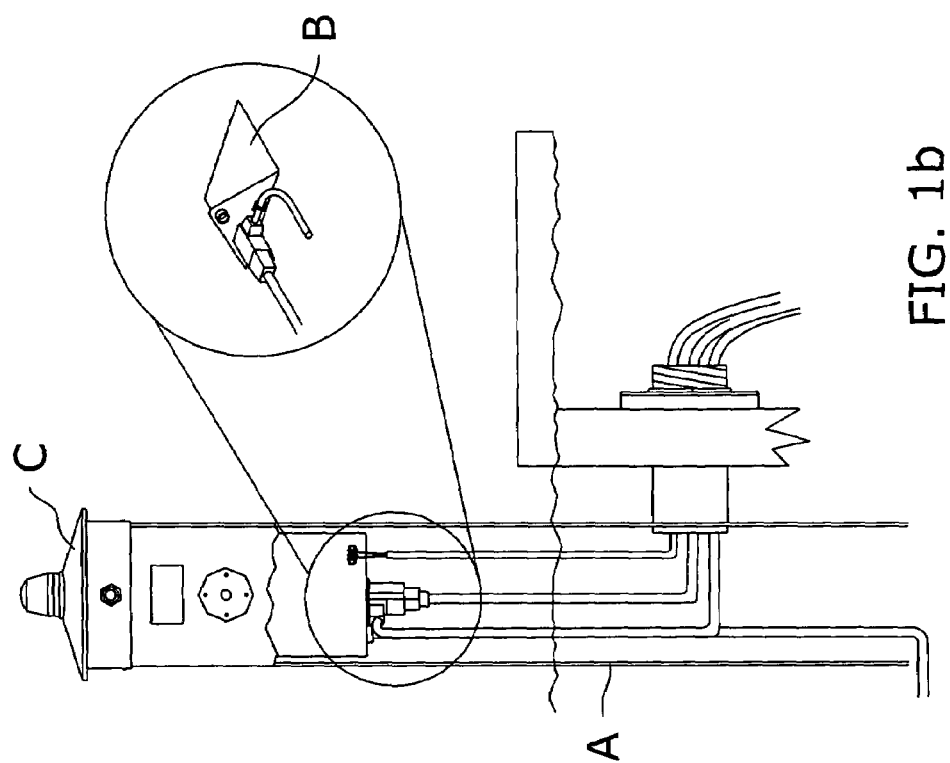
FIG. 1b is a front view of a second exemplary electrical enclosure for an alarm circuit and pump control circuit that has a tubular base, a bracket attached within the base and a cap.
Figure 1A:
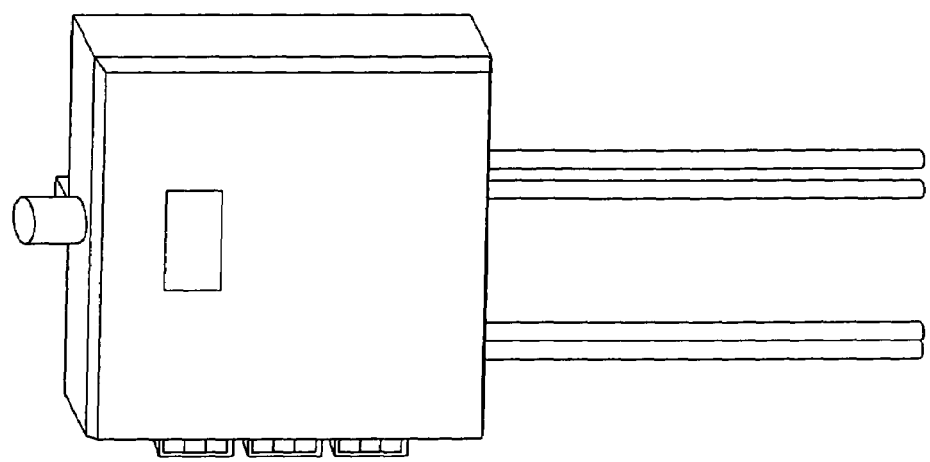
FIG. 1a is a front view of an exemplary electrical enclosure for an alarm circuit and pump control circuit that is attached to a post or other structure.

Turning now descriptively to the drawings, in which similar reference characters denote similar elements throughout the several views, FIGS. 2 through 10 illustrate an electrical enclosure system 10, which comprises a tubular pedestal 20 having an upper opening 22, and a cap 30 removably positioned within the upper opening 22 of the pedestal 20. The cap 30 contains electrical wiring and components for a pump control/alarm system 60. A bracket 40 is attached to the interior of the cap 30 for receiving and securing the cables extending from the pump control/alarm system 60 to a lower portion of the pedestal 20.

B. Pedestal

FIGS. 2, 3, 8 and 9 illustrate an exemplary tubular pedestal 20 suitable for usage with the present invention. As can be appreciated, the pedestal 20 may have various sizes, lengths and cross sectional shapes. The pedestal 20 is preferably designed to allow for the passage of a plurality of cables for the pump control/alarm system 60 as best illustrated in FIG. 3 of the drawings.

Figure 2:
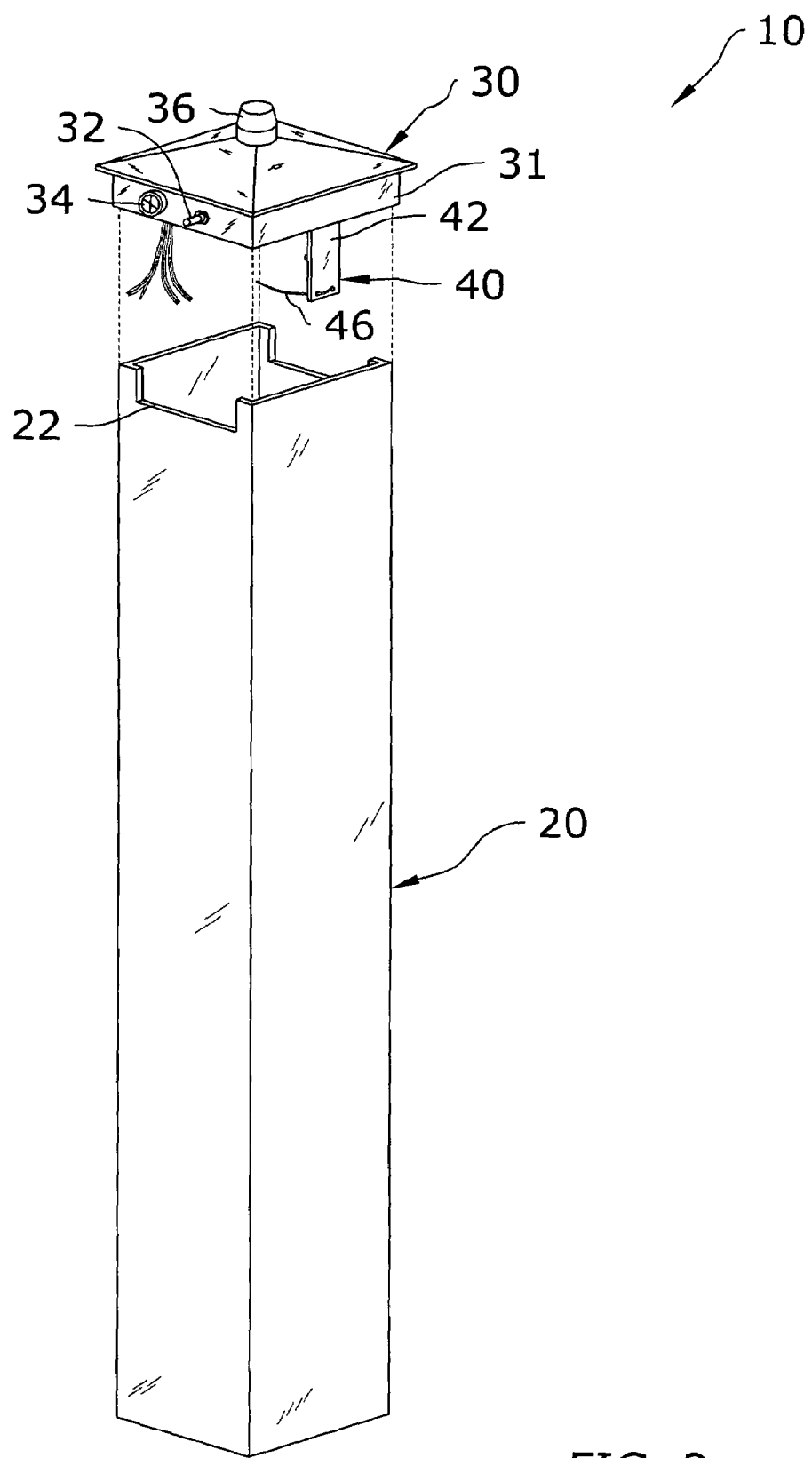
FIG. 2 is an exploded upper perspective view of the present invention.

As shown in FIG. 2 of the drawings, the pedestal 20 includes an upper opening 22. The upper opening 22 receives the cap 30 as shown in FIGS. 2 and 3 of the drawings. The upper opening 22 may have various sizes and shapes as can be appreciated by one skilled in the art of the present invention. The upper opening 22 preferably faces upwardly when the pedestal 20 is installed in an upright position as shown in FIG. 2 of the drawings. Cutouts and other configurations may be utilized within the upper opening 22 to allow for various configurations of the cap 30.

C. Cap and Bracket Combination

Figure 5:
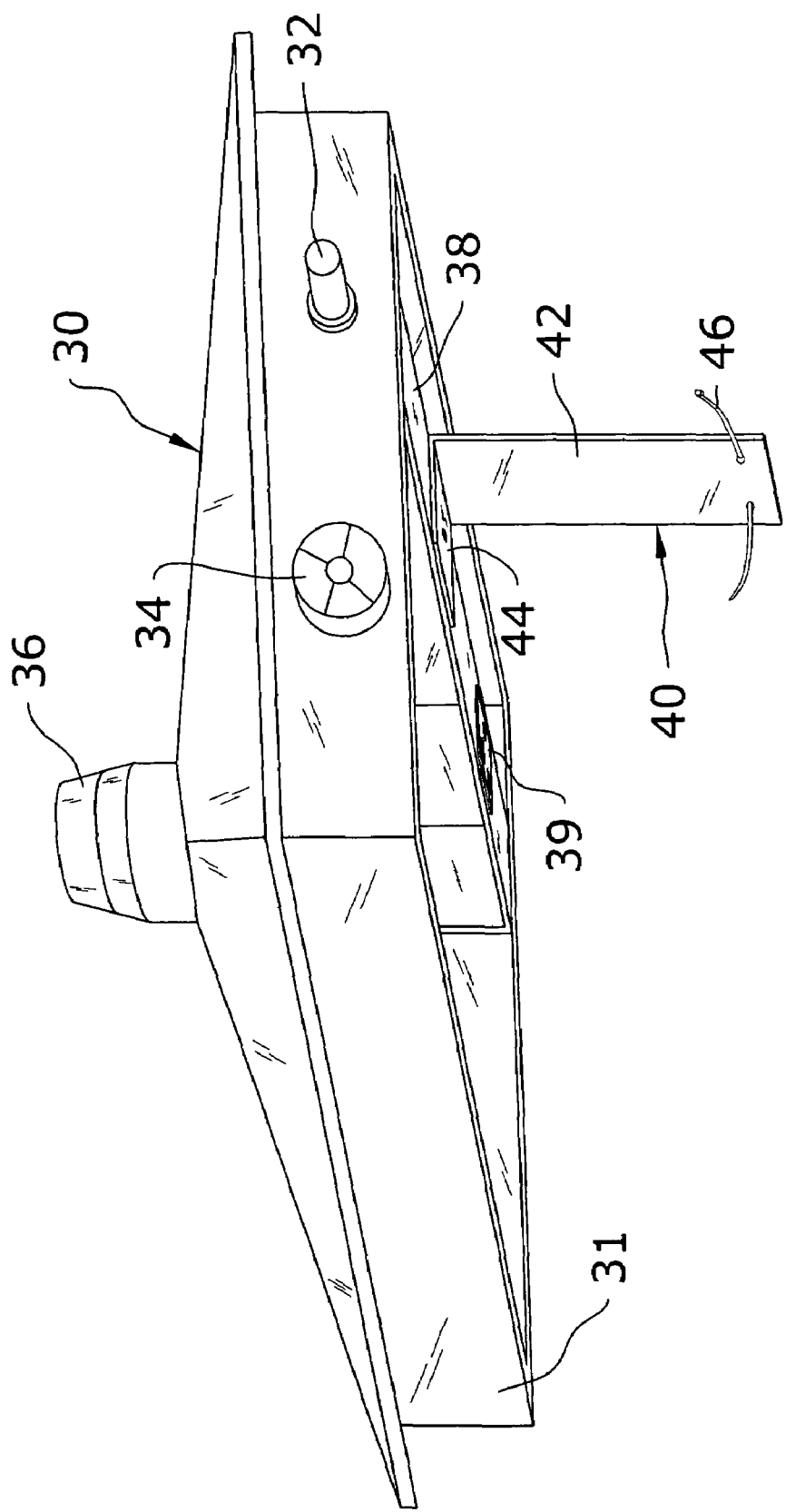
FIG. 5 is a lower perspective view of the cap of the present invention.
Figure 6:
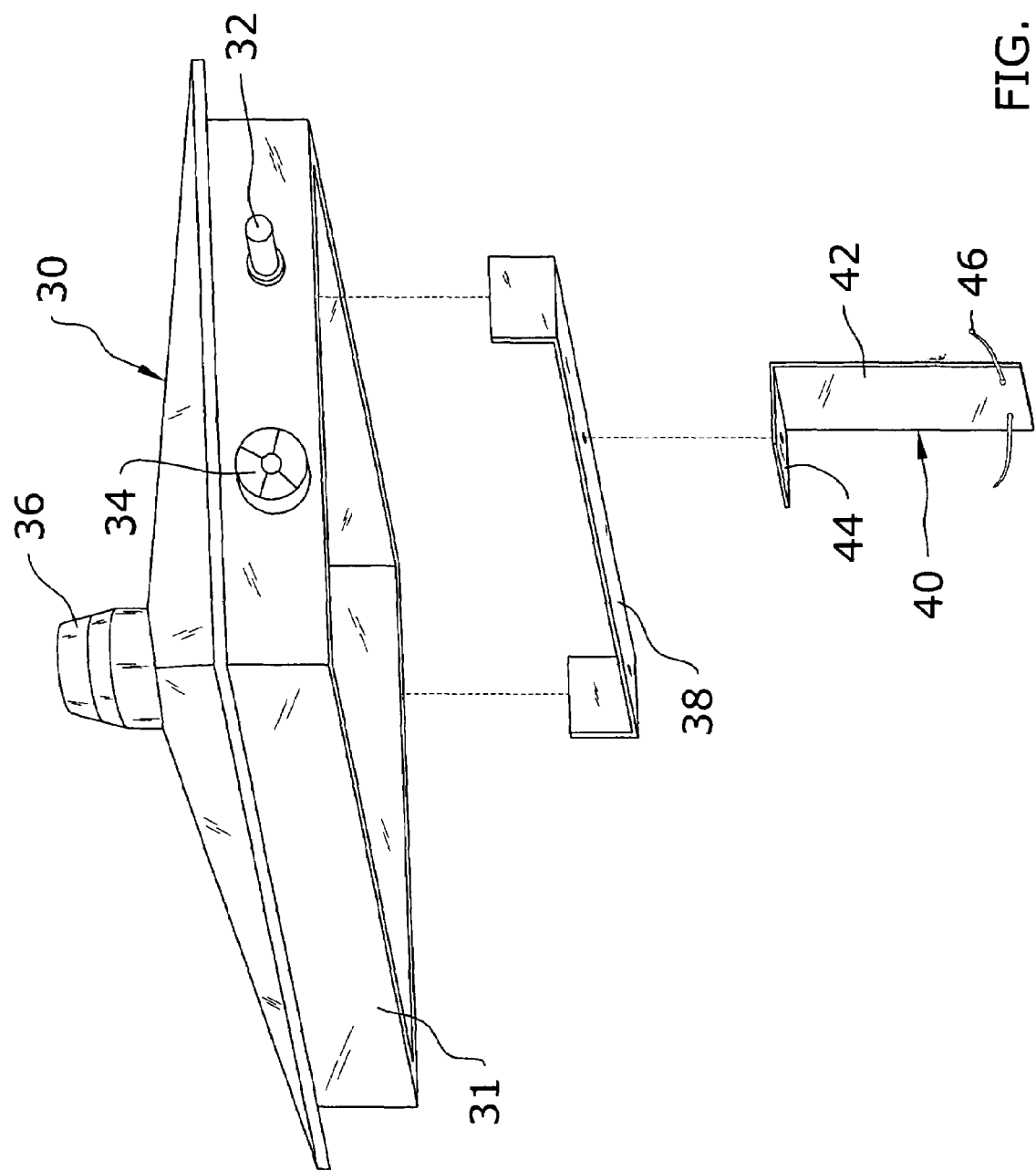
FIG. 6 is an exploded lower perspective view of the cap of the present invention.
Figure 7:
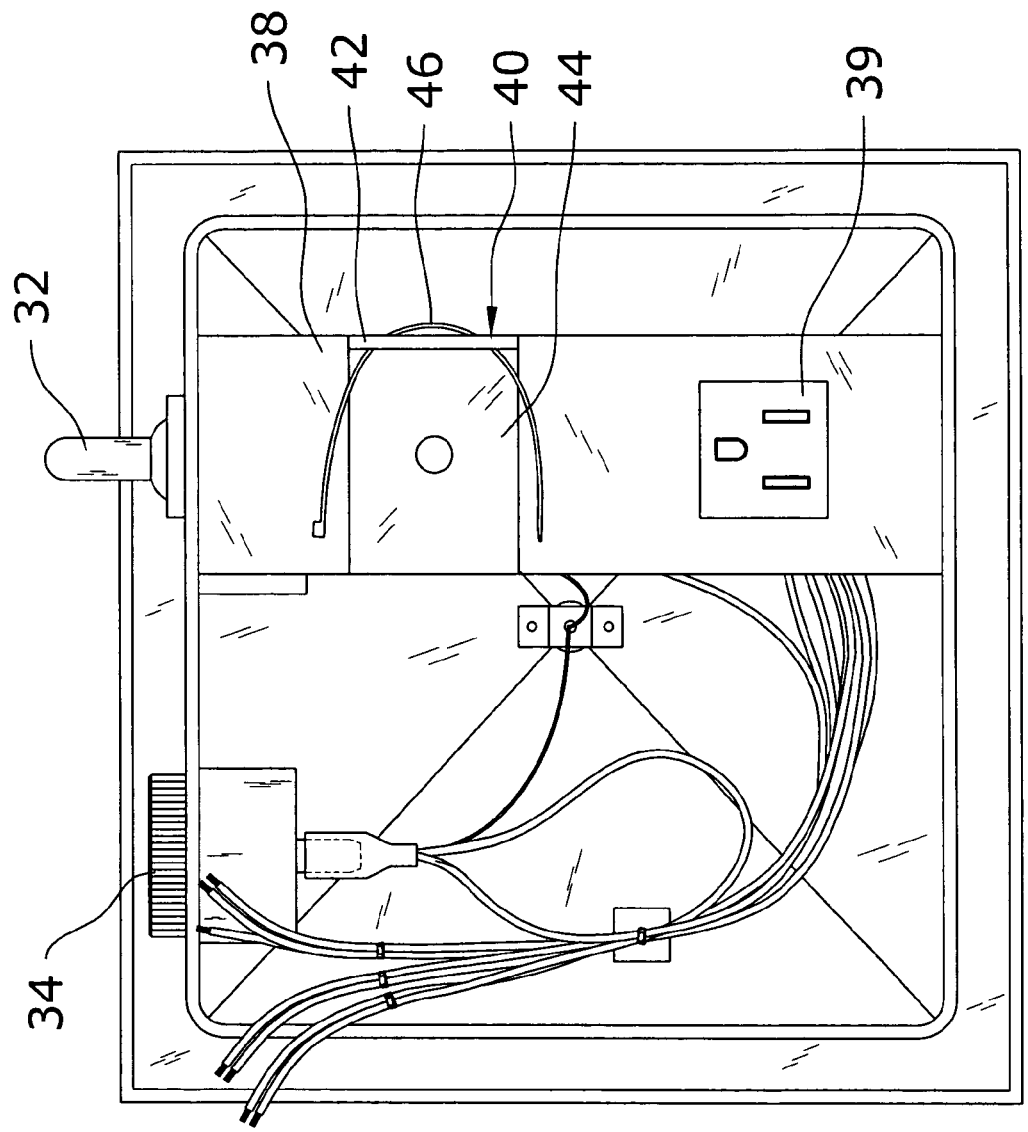
FIG. 7 is a bottom view of the cap of the present invention.
Figure 8:
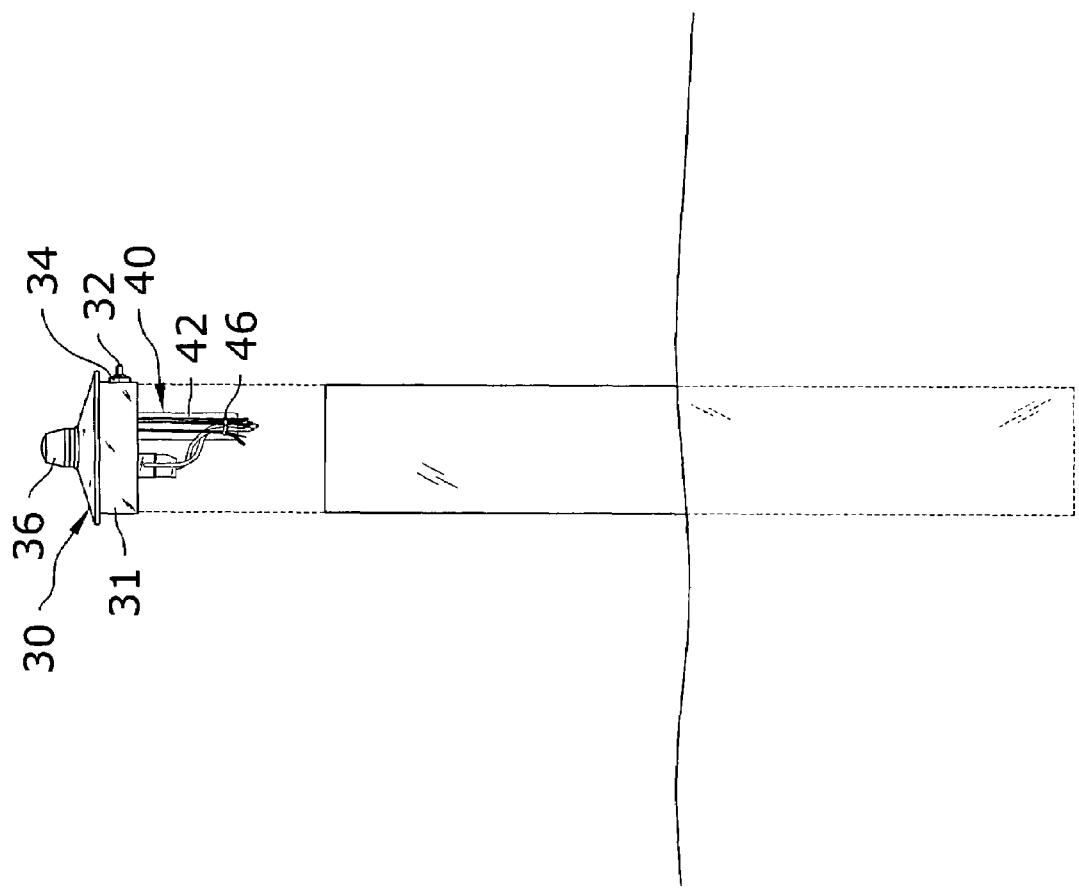
FIG. 8 is an exploded side view of the present invention installed within a ground surface.

The cap 30 is removably positioned within the upper opening 22 of the pedestal 20 as shown in FIGS. 2 and 3 of the drawings. The cap 30 may have various exterior structures and shapes as can be appreciated by one skilled in the art. As illustrated in FIGS. 5 through 7 of the drawings, the cap 30 preferably has an interior cavity that receives and contains a pump control/alarm system 60 used to control an external pump and activate an alarm. The cap 30 preferably has one or more lower sides 31 that extend inside or externally of the upper end of the pedestal 20 for selectively enclosing the upper opening 22 as shown in FIG. 2 of the drawings.

A support member 38 is preferably attached substantially horizontally within the cap 30 as shown in FIGS. 5 through 7 of the drawings. The support member 38 preferably has a U-shaped structure with flanged end portions, wherein the flanged end portions extend upwardly and are secured within the inner walls of the cap 30. The support member 38 preferably has a relatively flat cross section for efficiently utilizing space within the cap 30 and for mounting electrical components to the same (e.g. receptacle 39).

The bracket 40 is preferably attached to an interior of the cap 30 for receiving and securing one or more cables extending from the pump control/alarm system 60 as shown in FIGS. 2, 3, 5, 6 and 7 of the drawings. The bracket 40 is preferably aligned centrally to one side of the cap 30 as shown in FIG. 2 of the drawings.

The bracket 40 preferably has an inverted L-shaped structure as best illustrated in FIGS. 5 and 6 of the drawings, though other structures may be utilized. The bracket 40 is preferably comprised of an upper portion 44 that is attached to the support member 38 and an extended portion 42 that extends from the upper portion 44 in a downward manner as shown in FIGS. 2 through 7 of the drawings.

A securing member 46 is preferably attached to the extended portion 42 of the bracket 40 for securing one or more cables to the extended portion 42. The securing member 46 is preferably attached to a lower portion of the extended portion 42 for providing leverage to the cables and to prevent unnecessary forces being applied to the connections within the pump control/alarm system 60. The securing member 46 is preferably comprised of a tie, however other securing devices may be utilized.

Figure 10:
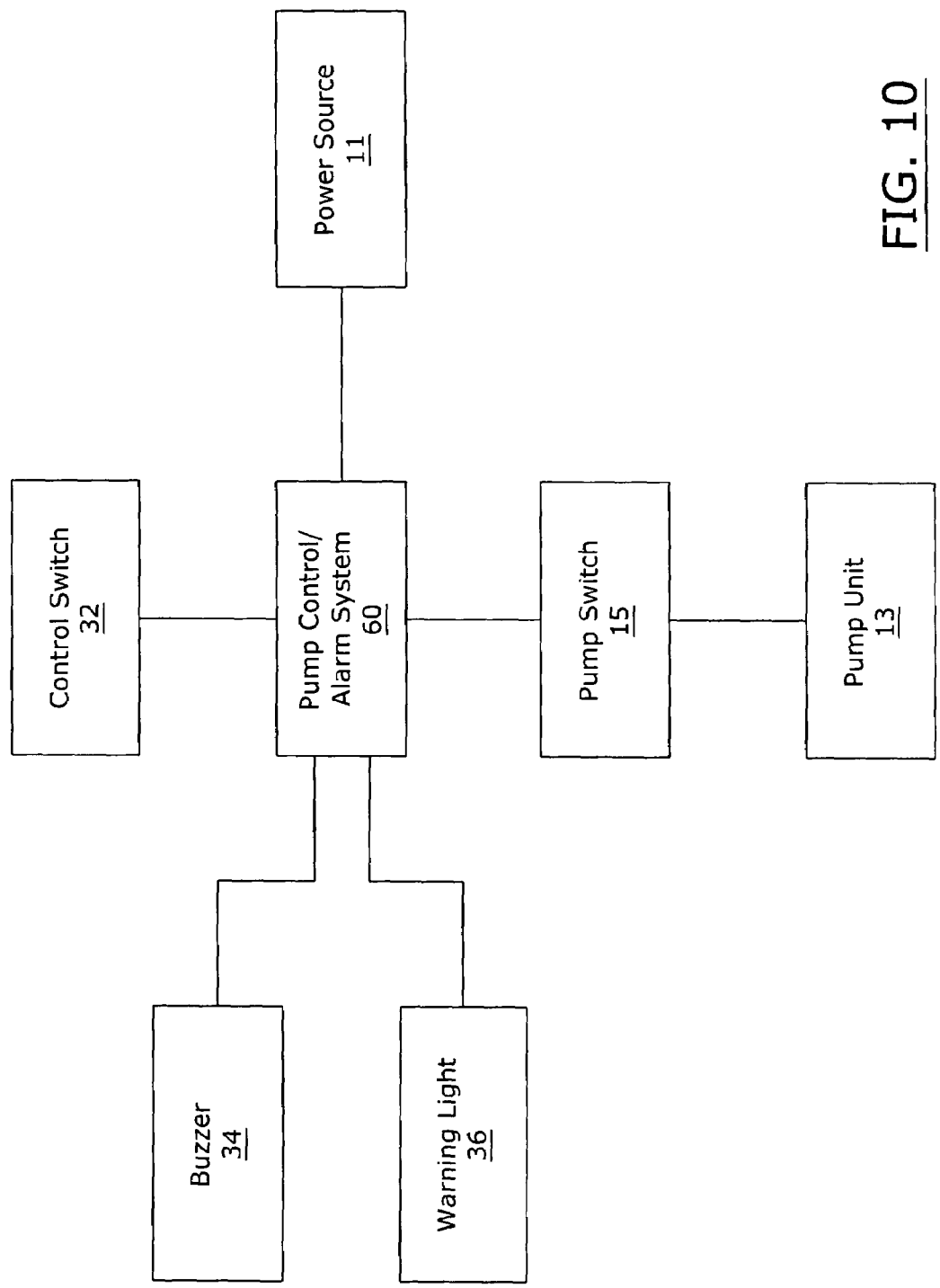
FIG. 10 is a block diagram of the electrical components of the present invention.

As shown in FIG. 2 of the drawings, a control switch 32, a buzzer 34 and/or a warning light 36 are preferably attached to the cap 30. The control switch 32, the buzzer 34 and/or the warning light 36 are in communication with the pump control/alarm system 60 as shown in FIG. 10 of the drawings. As further shown in FIG. 10 of the drawings, the pump control/alarm system 60 is electrically connectable to the pump unit 13 (preferably through a pump switch 15) and a power source 11.

The control switch 32 allows an operator to select various states for the pump control/alarm system 60 such as but not limited to test, normal or non-audible warning state. The buzzer 34 emits an audible alarm when an alarm situation with the pump or other device occurs. The warning light 36 is illuminated when an alarm situation with the pump or other device occurs.

D. Installation and Use of Present Invention

In use, the user installs the pedestal 20 in a desired location adjacent to a pump tank 12 (e.g. septic tank, etc.) containing the pump unit 13 as shown in FIG. 3 of the drawings. A lower opening within the pedestal 20 allows for the passage of the alarm cable 16, the pump cable 18 and the pump switch cable 19 as shown in FIG. 3 of the drawings. These cables 16, 18, 19 are passed through an opening within the pump tank 12 and then electrically connected to the pump unit 13.

Figure 9:
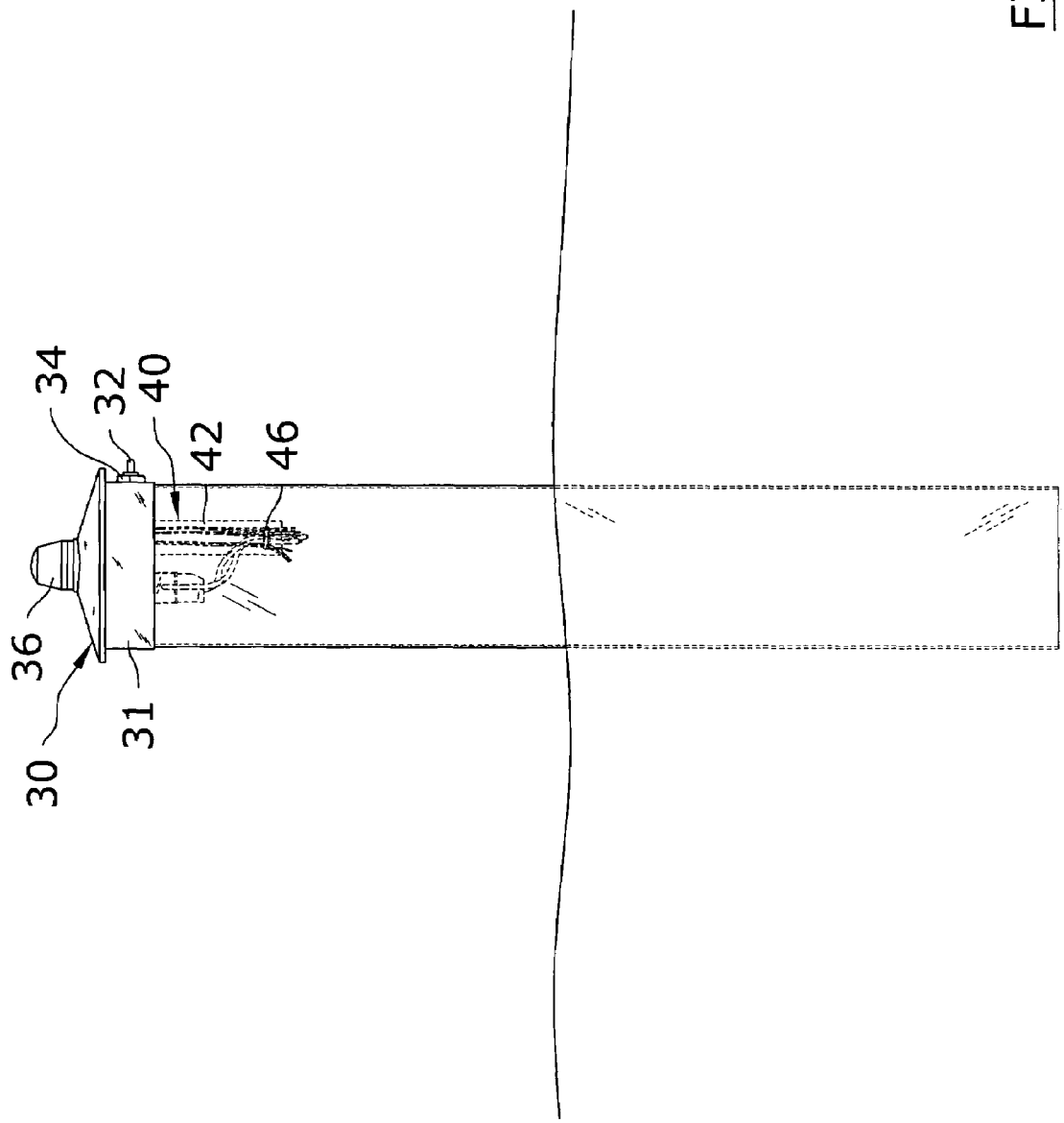
FIG. 9 is a side view of the present invention installed within a ground surface.

The user then positions the cap 30 near the pedestal 20 and electrically connects the cables 16, 18, 19 to the pump control/alarm system 60. A piggy back switch 50 may be utilized and electrically connected to the receptacle 39 to provide a means for electrically connecting the pump to the pump switch. In addition, an electrical power cable 14 is extended into the interior of the pedestal 20 to the pump control/alarm system 60 and electrically attached to the same to provide electrical power to the present invention. After all of the electrical connections are made, the cap 30 is then positioned upon the pedestal 20 and the upper opening 22 as shown in FIGS. 3 and 9 of the drawings. The user then is able to operate the present invention as they normally would a conventional pump control/alarm system 60. If repairs or modifications are required to the pump control/alarm system 60, the user simply removes the cap 30 thereby effectively removing all of the electrical components and connections simultaneously from within the pedestal 20 for providing efficient access to the same.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. An electrical enclosure system for a pump control and alarm system, comprising:
    a tubular pedestal including an upper opening;
    a cap removably positioned within said upper opening of said pedestal;
    a pump control and alarm system being attached to said cap; and
    a bracket attached to an interior of said cap for receiving and securing one or more cables extending from said pump control and alarm system.

2. The electrical enclosure system of claim 1, wherein said bracket extends downwardly from said cap.

3. The electrical enclosure system of claim 1, wherein said bracket is centrally aligned within said cap.

4. The electrical enclosure system of claim 1, wherein said bracket is comprised of an upper portion that is attached to said cap, and an extended portion that extends from said upper portion in a downward manner.

5. The electrical enclosure system of claim 4, including a support member attached substantially horizontally within said cap and wherein said upper portion is secured to said support member.

6. The electrical enclosure system of claim 5, including a power receptacle attached to said support member.

7. The electrical enclosure system of claim 5, wherein said support member has a U-shaped structure.

8. The electrical enclosure system of claim 4, wherein said bracket has an inverted L-shaped structure.

9. The electrical enclosure system of claim 4, wherein said bracket includes a securing member attached to said extended portion for securing one or more cables to said extended portion.

10. The electrical enclosure system of claim 9, wherein said securing member is attached to a lower portion of said extended portion.

11. The electrical enclosure system of claim 9, wherein said securing member is comprised of a tie.

12. The electrical enclosure system of claim 1, wherein said bracket includes a securing member for securing one or more cables to said extended portion.

13. The electrical enclosure system of claim 12, wherein said securing member is attached to a lower portion of said extended portion.

14. The electrical enclosure system of claim 12, wherein said securing member is comprised of a tie.

15. The electrical enclosure system of claim 1, including a control switch within said cap, wherein said control switch is in communication with said pump control and alarm system.

16. The electrical enclosure system of claim 1, including a buzzer and/or a warning light within said cap, wherein said buzzer and/or said warning light is in communication with said pump control and alarm system.

17. An electrical enclosure system for a pump control and alarm system, comprising:
    a tubular pedestal including an upper opening;
    a cap removably positioned within said upper opening of said pedestal;
    a pump control and alarm system being attached to said cap;
    a support member attached substantially horizontally within said cap, wherein said support member has a U-shaped structure; and
    a bracket attached to an interior of said cap for receiving and securing one or more cables extending from said pump control and alarm system, wherein said bracket has an inverted L-shaped structure and wherein said bracket is comprised of:
        an upper portion that is attached to said support member;
        an extended portion that extends from said upper portion in a downward manner; and
        a securing member attached to said extended portion for securing one or more cables to said extended portion, wherein said securing member is attached to a lower portion of said extended portion and wherein said securing member is comprised of a tie.

18. The electrical enclosure system of claim 17, wherein said bracket is centrally aligned within said cap.

19. The electrical enclosure system of claim 17, including a power receptacle attached to said support member.

20. The electrical enclosure system of claim 17, including a control switch, a buzzer and/or a warning light within said cap, wherein said control switch, said buzzer and/or said warning light is in communication with said pump control and alarm system.

* * * * *